H. CLIPP.
Bee Hive.
No. 63,472.
Patented April 2, 1867.
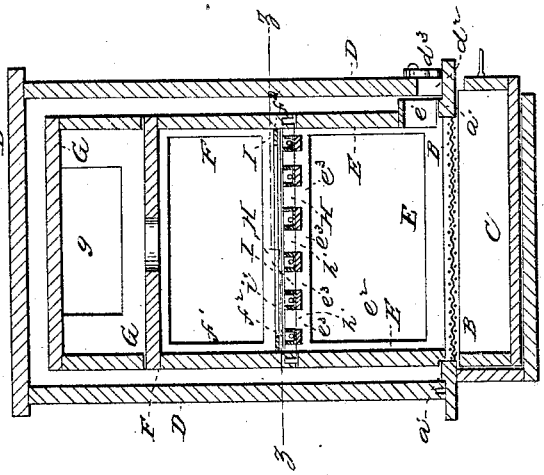
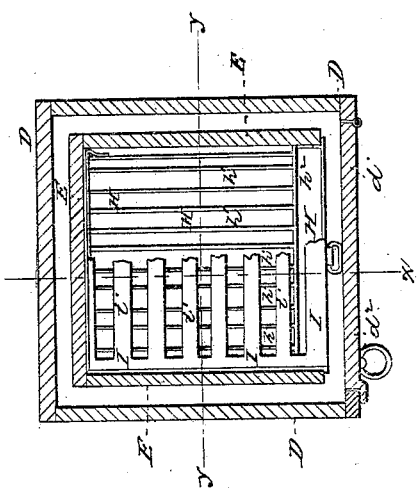
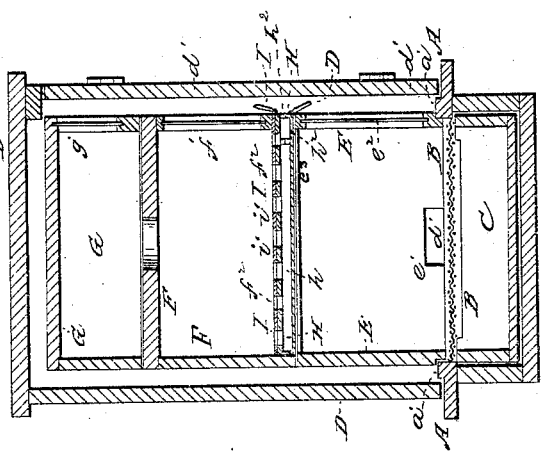
Witnesses:
F. A. Jackson
Wm Trewin
Inventor:
H. Clipp
Per Munn & Co,
Attorneys

United States Patent Office.

HAMILTON CLIPP, OF ORANGE, INDIANA.

Letters Patent No. 63,472, dated April 2, 1867.

---

IMPROVEMENT IN BEE-HIVES.

---

*The Schedule referred to in these Letters Patent and making part of the same.*

---

TO ALL WHOM IT MAY CONCERN:

Be it known that I, HAMILTON CLIPP, of Orange, in the county of Lawrence, and State of Indiana, have invented a new and useful Improvement in Bee-Hives; and I do hereby declare that the following is a full, clear, and exact description thereof, which will enable others skilled in the art to make and use the same, reference being had to the accompanying drawings, forming a part of this specification, in which—

Figure 1 is a vertical section of my improved bee-hive, taken through the line $x\ x$, fig. 3.

Figure 2 is a vertical section of the same, taken through the line $y\ y$, fig. 3.

Figure 3 is a horizontal section of the same, taken through the line $z\ z$, fig. 2.

Similar letters of reference indicate like parts.

My invention consists in the combination of a feeding trough with the interior boxes of the hive, so that the bees, when not at work, may be provided with food in such a manner as to prevent their escape or disturbance.

A is the bottom of the hive. The middle part of this bottom is cut away, as shown in figs. 1 and 2, and the opening thus formed is closed by a wire screen, B. Beneath the bottom A is placed a drawer, C, which may be partially drawn out to form a false opening for the ingress of moths, which are prevented by the screen B from finding their way up into the hive. Around the edge of the opening through the bottom A is formed a flange, $a'$, around which the lower edge of the outer case or box D fits, and is kept in place by dowelling pins attached to the said bottom A, and entering holes in the lower edge of the box D, as shown in fig. 2. One side, $d^1$, of the box or case is formed into a door, swinging upon hinges, as shown in figs. 1 and 3. By opening this door and looking through the glass sides or windows of the interior boxes, the condition of the interior of the hive may be inspected at any time. E is the lower interior box, the outer edge of the lower end of which is planed off so as to form a shoulder, which rests upon the upper edge of the flange $a'$ of the bottom A, within which flange the said lower end of the said box E enters, as shown in figs. 1 and 2. Through one side of the box E is formed a passage-way, $e^1$, leading to an opening, $d^2$, through the side of the outer box D, through which the bees may have ingress to and egress from the hive. This opening may be closed, when desired, by a door, $d^3$, pivoted to the outer side of the box D, as shown in fig. 2. The side $e^2$ of the box E which is towards the door $d^1$ of the box D is made wholly or partly of glass, as shown in fig. 1. Across the top of the box E are placed slots, $e^3$, about an inch in width, and about an inch apart, running from the side of said box next the door $d^1$ to the opposite side. F is the second box, the lower edge of which is secured to the upper edge of the box E by dowelling pins, as shown in fig. 2. The forward side $f^1$ of the box F is made wholly or partly of glass, as shown in fig. 1, and the said box has a hole through its top through which the bees may pass into and out of the top box G. The box G rests upon the top of the box F, and has its front side $g'$ made wholly or partly of glass, as shown in fig. 1. H are the feed troughs, which are placed in the lower part of the box F, just above the top of the box E, upon which they slide out and in. The feed troughs $h^1$ are about an inch wide, and half an inch deep, and are so arranged as to come just above the slats $e^3$, upon which the bottoms of said troughs rest and slide. The feed troughs $h^1$ communicate at their forward ends with the receiving trough $h^2$ by small holes, as shown in fig. 2, through which the liquid food for the bees, which is put into the receiving trough $h^2$, flows into the feeding troughs $h^1$. The rear side of the receiving trough $h^2$ should be made of such a size that when the troughs are drawn out to put in the food, the said rear side may fill up the space in the side of the box F, and prevent the bees from coming out. In the lower part of the box F are placed slots, $f^2$, running at right angles to the direction of the troughs $h^1$, and the ends of which are securely attached to the sides of the said box F. I is a sliding grate, the bars or slots $i'$ of which are of the same size, are at the same distance apart, and are parallel with the slats $f^2$. This grate works out and in through a slit in the side of the box F just above the slats $f^2$. By drawing the sliding grate I out the breadth of one slat the openings between the slats $f^2$ will be closed, and the bees be kept from passing down into the lower box E. This sliding grate is designed to be used whenever it is necessary to remove the box E for the purpose of destroying the moths, or for any other purpose. Upon such occasions the bees may be driven from the lower box E into the upper boxes by smoke. The sliding grate I may be then drawn out, and the bees secured in the upper boxes, after which the hive can be taken apart, and the box E removed, cleaned, and replaced without disturbing the bees.

I claim as new, and desire to secure by Letters Patent—

The combination of the sliding feed troughs H with the interior boxes E and F of the hive, when said sliding troughs are constructed and arranged substantially as herein described, and for the purpose set forth.

HAMILTON CLIPP.

Witnesses:
NEWTON F. MALOTT,
M. A. MALOTT.